US009471956B2

(12) United States Patent
Lu et al.

(10) Patent No.: US 9,471,956 B2
(45) Date of Patent: Oct. 18, 2016

(54) GRAPHIC REMOTING SYSTEM WITH MASKED DMA AND GRAPHIC PROCESSING METHOD

(71) Applicant: ASPEED Technology Inc., Hsinchu (TW)

(72) Inventors: Chung-Yen Lu, Hsinchu (TW); Kuo-Wei Yeh, Hsinchu (TW); Ming-Chi Bai, Hsinchu (TW); Lung-Hsiang Kai, Hsinchu (TW)

(73) Assignee: ASPEED TECHNOLOGY INC., Hsinchu (TW)

( * ) Notice: Subject to any disclaimer, the term of this patent is extended or adjusted under 35 U.S.C. 154(b) by 116 days.

(21) Appl. No.: 14/473,607

(22) Filed: Aug. 29, 2014

(65) Prior Publication Data

US 2016/0063667 A1    Mar. 3, 2016

(51) Int. Cl.
*G09G 5/36*  (2006.01)
*G06T 1/60*  (2006.01)
*G06T 1/20*  (2006.01)

(52) U.S. Cl.
CPC . *G06T 1/60* (2013.01); *G06T 1/20* (2013.01); *G06T 2200/28* (2013.01)

(58) Field of Classification Search
CPC .. G06F 3/1454; G06F 3/1462; G06F 9/4445; G09G 5/399; G09G 2310/04; G09G 5/393; G09G 5/395; G09G 2320/103; G09G 2360/18
See application file for complete search history.

(56) References Cited

U.S. PATENT DOCUMENTS

| 2003/0095125 | A1 | 5/2003 | Lim et al. |
| 2004/0075657 | A1 | 4/2004 | Chua et al. |
| 2008/0165178 | A1 | 7/2008 | Chu et al. |
| 2009/0033670 | A1 | 2/2009 | Hochmuth et al. |
| 2009/0225088 | A1 | 9/2009 | Aoki |
| 2011/0134120 | A1* | 6/2011 | Antonyuk ............. G06F 3/1454 345/426 |
| 2012/0113327 | A1 | 5/2012 | Li et al. |
| 2014/0125685 | A1 | 5/2014 | Yeh et al. |

* cited by examiner

FOREIGN PATENT DOCUMENTS

TW            201215148 A1    4/2012

*Primary Examiner* — Hau Nguyen
(74) *Attorney, Agent, or Firm* — Muncy, Geissler, Olds & Lowe, P.C.

(57) ABSTRACT

An embodiment of a graphic remoting system of the present invention includes a network, a server and a client device. The network is applied to a RDP protocol. The server transfers display rendering commands which indicates a destination region through the network. The client device receives the display rendering commands. The client device of the present invention includes at least a graphic render engine, at least a surface, at least a mask generator, a plurality of mask buffer, at least a direct memory access with masks, and a plurality of display buffers. The surface is used for storing an image. The graphic render engine generates the image and stores the image into the surface according to the destination region. The mask buffers is used for storing bit masks; wherein the content values of the mask buffers are indicating updated areas of the image stored in the surface. The mask generator generates the bit masks according to the destination region, and stores the bit masks into the mask buffers. The direct memory access with masks reads the content values of a current mask buffer and a previous mask buffer of the plurality of mask buffers, and copies the image stored in the surface to output a copied image to the display buffer according to the content values of the current mask buffer and the previous mask buffer. The plurality of display buffers receive the copied image from the direct memory access with masks and reconstruct a complete image according to the copied image to output the complete image to a display device.

20 Claims, 8 Drawing Sheets

Previous bit mask (F2)

| 0 | 0 | 0 |
|---|---|---|
| 0 | 0 | 0 |
| 0 | 0 | 1 |

Current bit mask (F3)

| 0 | 0 | 0 |
|---|---|---|
| 0 | 1 | 0 |
| 0 | 1 | 0 |

Output bit mask (F2||F3)

| 0 | 0 | 0 |
|---|---|---|
| 0 | 1 | 0 |
| 0 | 1 | 1 |

GRAPHIC REMOTING SYSTEM WITH MASKED DMA AND GRAPHIC PROCESSING METHOD

BACKGROUND OF THE INVENTION

Field of the Invention

This invention relates to an image processing system, and more particularly, to a method and system with masked DMA.

In a related prior art, Microsoft's MSDN library documentation, such as remote desktop protocol including graphics pipeline extension (MS-RDPEGFX), graphics device interface acceleration extensions (MS-RDPEGDI), a basic connectivity and graphics remoting specification (MS-RDPBCGR), provides a description of a graphic remoting system. The graphic remoting system may send data through wire, and operate with a compatible client to receive, decode and render the data. In this graphic remoting system, bitmaps may be transferred from a server to a surface on the compatible client, be transferred between surfaces, or be transferred between a surface and a bitmap cache.

As shown in FIG. 1, a general graphic remoting system 100 includes graphic render engines 101, at least a surface 102, a direct memory access (DMA), display buffers 104 (also called "shadow buffer" or "offscreen buffer" or "output buffer") and a display device 105. The graphic remoting system 100 uses a special frame composition command "RDPGFX_MAP_SURFACE_TO_OUTPUT_PDU message" to instruct the compatible client to access the surface 102 to a rectangular area through the direct memory access 103 to the display buffers 104. After the graphic has been reconstructed completely in the display buffers 104, a whole frame image data are moved from the display buffers 104 to the display device 105 for displaying.

The above mentioned conventional technique is called a single buffer structure. In the single buffer structure, a memory access needs a large amount of memory so that a system performance is dramatically reduced. Another problem with a single buffer structure is a screen tearing. The screen tearing is a visual artifact where information from two or more different frames is shown in a display device with a single screen draw. For high resolution image, there is no enough time to move frame image content from one buffer to the other buffer in vertical retrace interval of display device. A most common solution to prevent screen tearing is to use multiple frames buffering, such as the double-buffering. However, the multiple frames buffering needs to store a completely frame of an image data. It may result in an increased cost of memory and processing time.

SUMMARY OF THE INVENTION

In view of the above mentioned problem, how to reduce the cost of memory and increase the processing speeds of a graphic remoting system need to be addressed.

In view of the above mentioned problem, a graphic remoting system with masked DMA and a processing method is disclosed in embodiments of the invention. The graphic remoting system includes a masked mechanism for detecting updated pixels in a frame and only needs to process the updated pixels so as to reduce a memory usage and processing time.

An embodiment of a graphic remoting system of the present invention includes a network, a server and a client device. The network is applied to a RDP protocol. The server transfers display rendering commands which indicates a destination region through the network. The client device receives the display rendering commands. The client device of the present invention includes at least a graphic render engine, at least a surface, at least a mask generator, a plurality of mask buffer, at least a direct memory access with masks, and a plurality of display buffers. The surface is used for storing an image. The graphic render engine generates the image and stores the image into the surface according to the destination region. The mask buffers is used for storing bit masks; wherein the content values of the mask buffers are indicating updated areas of the image stored in the surface. The mask generator generates the bit masks according to the destination region, and stores the bit masks into the mask buffers. The direct memory access with masks reads the content values of a current mask buffer and a previous mask buffer of the plurality of mask buffers, and copies the image stored in the surface to output a copied image to the display buffers according to the content values of the current mask buffer and the previous mask buffer. The display buffers receive the copied image from the direct memory access with masks and reconstruct a complete image according to the copied image to output the complete image to a display device.

An embodiment of method for processing graphics of the present invention includes the following steps: generating an image and storing the image into a surface according to a destination region; generating bit masks according to the destination region and storing the bit masks into a plurality of mask buffers; wherein the content values of the mask buffers are indicating updated areas of the image stored in the surface; reading the content values of a current mask buffer and a previous mask buffer; copying the image stored in the surface to output a copied image to a display buffer according to the content values of a current mask buffer and a previous mask buffer; and receiving the copied image from the direct memory access with masks and reconstructing a complete image according to the copied image to output the complete image to a display device.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4B shows another embodiment schematically operation diagram of the client device of the invention.

FIG. 4C shows another embodiment schematically operation diagram of the client device of the invention.

FIG. 4D shows another embodiment schematically operation diagram of the client device of the invention.

DETAILED DESCRIPTION OF THE INVENTION

In this specification and the appended claims, some specific words are used to describe specific elements. It should be understood by those who are skilled in the art that some hardware manufacturer may use different names to indicate the same element. In this specification and the appended claims, elements are not differentiated by their names but their functions. As used herein and in the claims, the term "comprising" is inclusive or open-ended and does not exclude additional unrecited elements, compositional components, or method steps. Besides, the term "coupling", when used herein and in the claims, refers to any direct or indirect connection means. Thus, if the specification describes a first device is coupled to a second device, it indicates that the first device can be directly connected (via signal connection, including electrical connection, wireless transmission, optical transmission, etc.) to the second device, or be indirectly connected to the second device via another device or connection means.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context.

Figure 1:
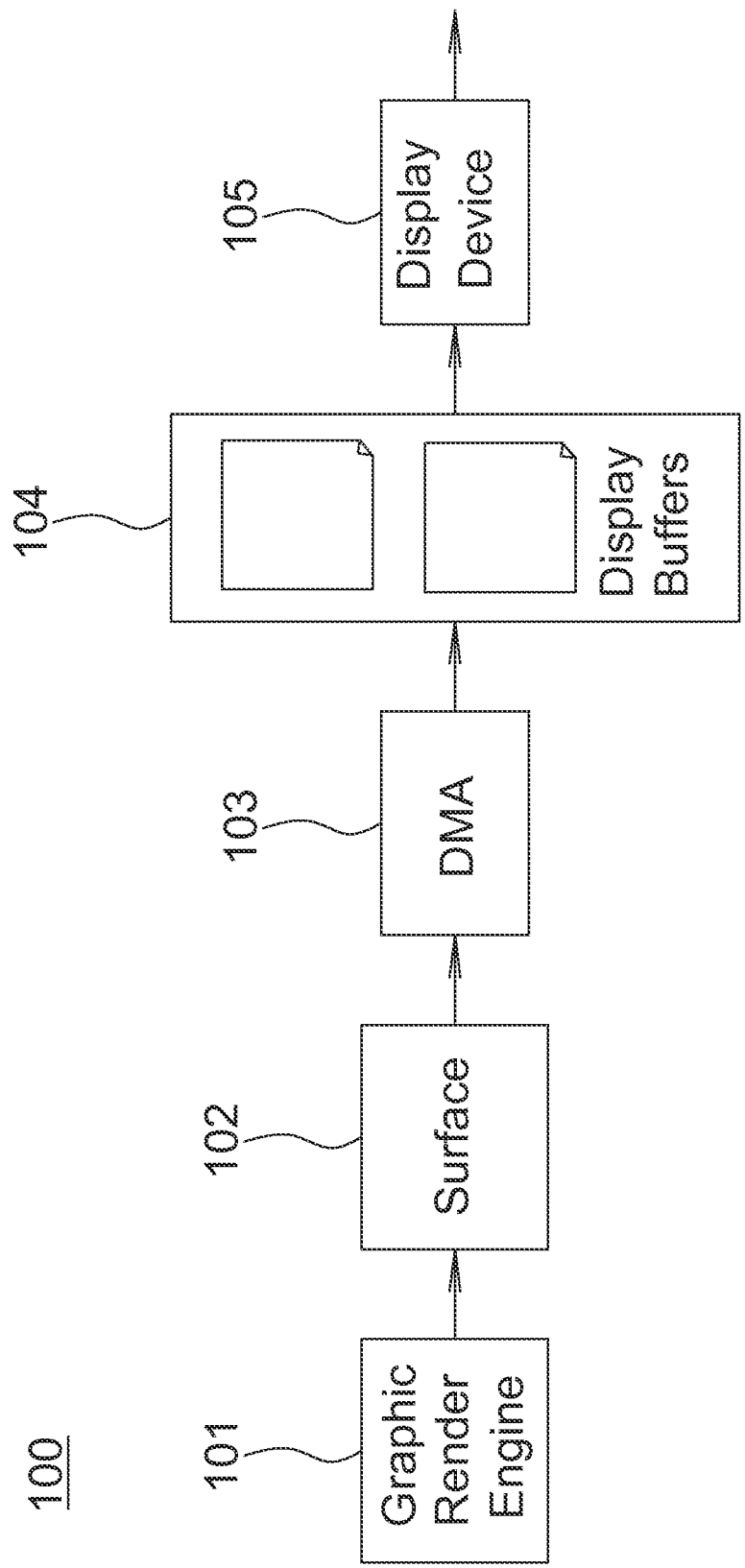
FIG. 1 is a diagram showing a prior client device.
Figure 2:
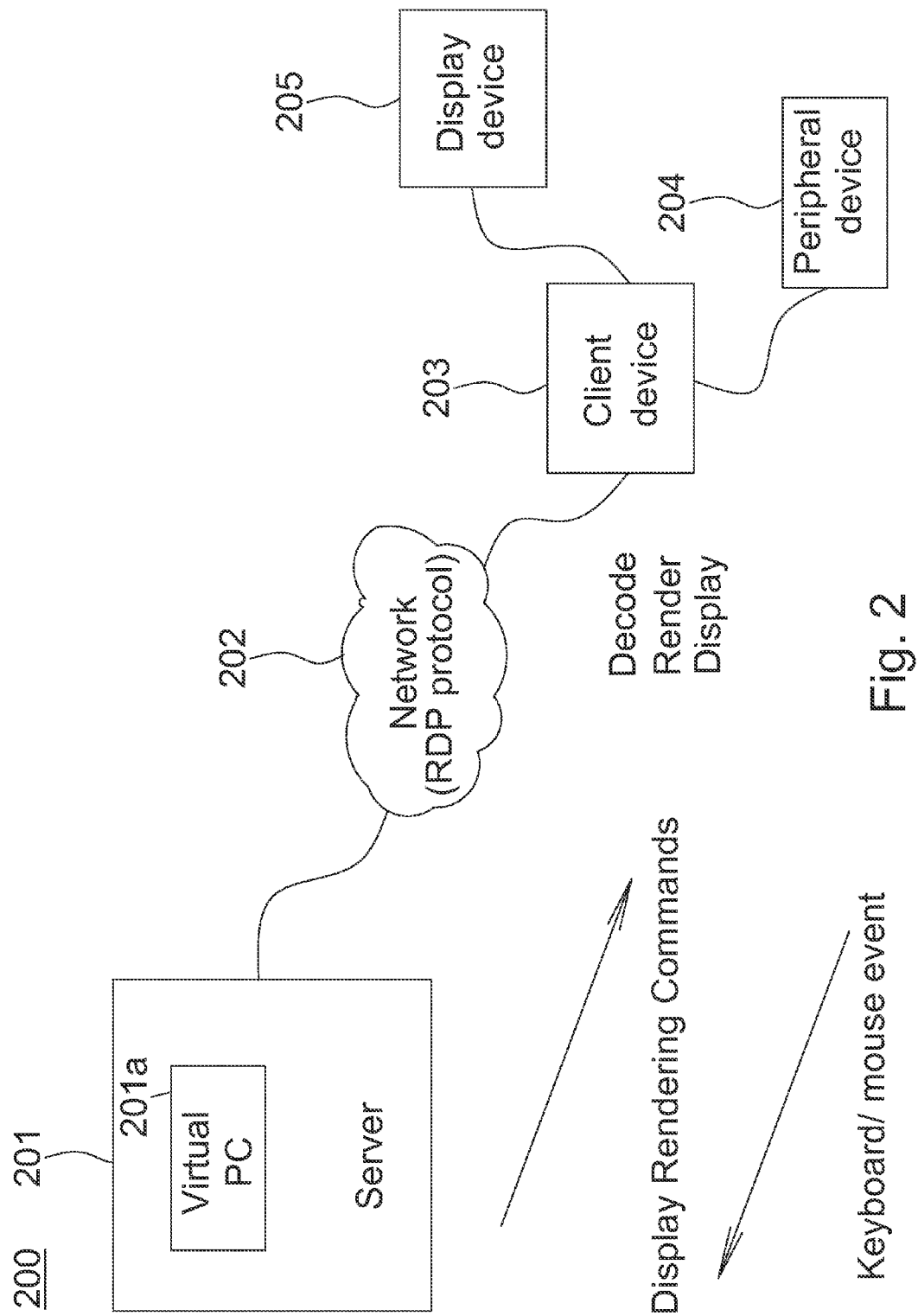
FIG. 2 shows a diagram illustrating an embodiment of a graphic remote system.

FIG. 2 shows a diagram according to an embodiment of a graphic remoting system 200 of the invention. In the embodiment, the graphic remoting system 200 includes a server 201, a network 202, a client device 203, at least a peripheral device 204 and a display device 205.

In an embodiment, the network 202 may be a network with a RDP protocol (Remote Desktop Protocol).

In an embodiment, the client device 203 may be a thin-client Box.

The server 201 includes at least a virtual PC 201a which serves as a host computer for at least a client end (such as the client device 203). The server 201 may generate display rendering commands which indicates a destination region to the client device 203 through the network 202 according to a keyboard/mouse event from the peripheral device 204. Then the client device 203 may reconstruct a complete frame which is driven to a display device 205 for display.

Figure 3:
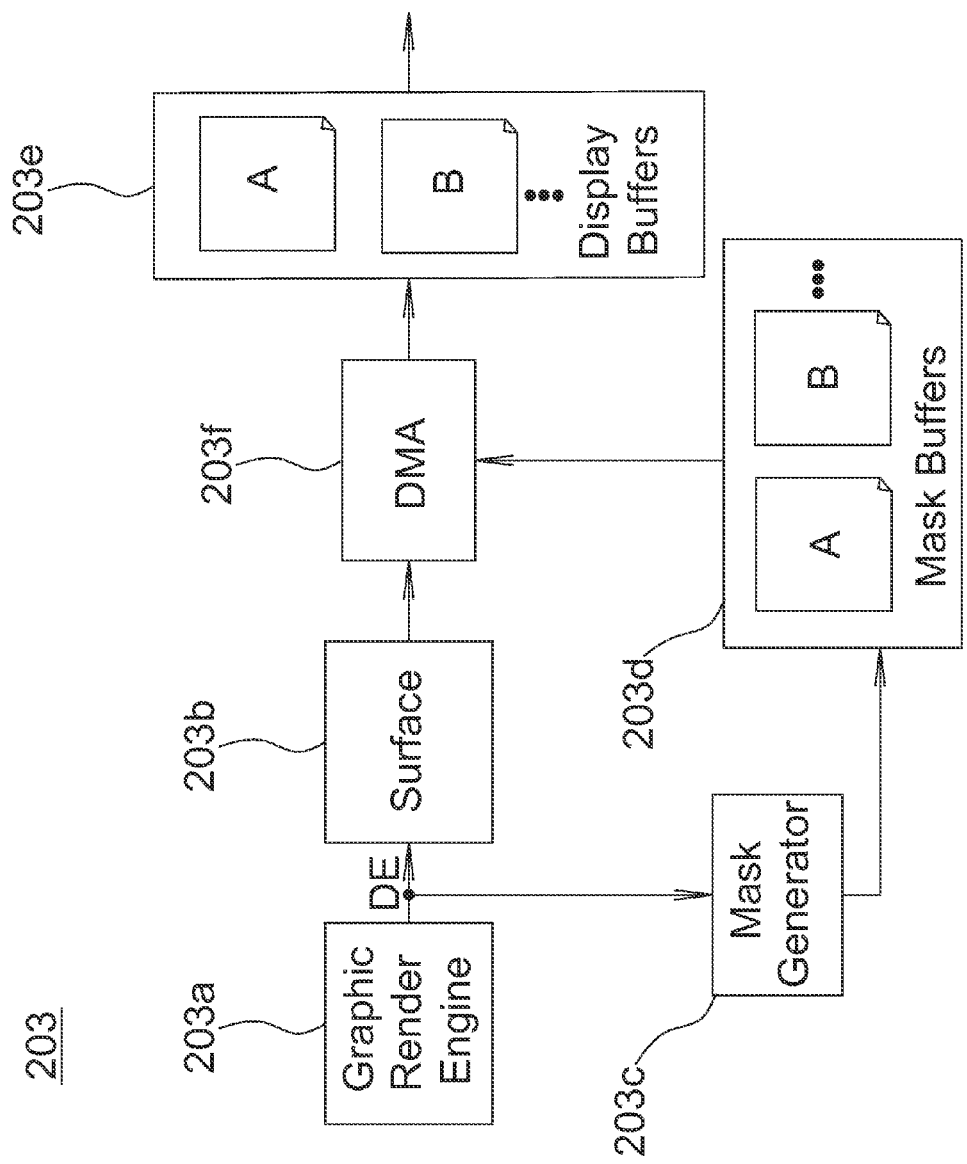
FIG. 3 shows a diagram illustrating an embodiment of a client device.

FIG. 3 shows a functional block diagram according to an embodiment of the client device 203 of the invention. The client device 203 receives the display rendering commands. In an embodiment, the client device 203 includes at least a graphic render engine 203a, at least a surface 203b, at least a mask generator 203c, a plurality of mask buffers 203d, a plurality of display buffers 203e and a direct memory access with masks (DMA with masks) 203f.

The graphic render engine 203a generates an image and stores the image into the surface 203b according to the destination region (render region) DE. For example, the graphic render engine 203a may be applied to a RDP (Remote Desktop Protocol)-EGFX (Graphics Pipeline Extension) such as Wire-To-Surface PDU (Processing Data Unit) for writing a codec ID, a target rectangle (x,y,w,h) and encoded data from wire to a surface, a Surface-To-Surface PDU for writing a target rectangle (x,y,w,h) from one surface to another surface, and a Cache-To-Surface PDU for writing a target rectangle (x,y,w,h) from a cache to a surface.

The surface 203b is used to store the image.

The mask generator 203c generates a plurality of bit masks according to the destination region DE and stores the bit masks into the mask buffers 203d.

The plurality of mask buffers 203d are used to store the plurality of bit masks, and the content values of the mask buffers are indicating updated areas of the image stored in the surface. In one embodiment, in each of the bit masks (A, B, ... ), each pixel position is marked with one of two signs (1 or 0), indicating whether the pixel value at the corresponding position of the current surface and its previous surface is altered.

The direct memory access with masks 203f reads the content values of a current mask buffers and a previous mask buffers, and copies the image stored in the surface 203b to output a copied image to the display buffers 203e according to the content values of a current mask buffers and a previous mask buffers.

The plurality of display buffers 203e receive the copied image from the direct memory access with masks 203f and reconstruct a complete image according to the copied image to output the complete image to the display device 205.

Please note that, in the bit mask, each pixel position may be marked with one of two signs, such as logic 0 or 1, indicating whether the pixel value at the corresponding position of the current surface and the previous surface is altered.

In an embodiment of processing the updated areas, the direct memory access with masks 203f compares the sign of each pixel position between the previous bit mask and the current bit mask to generate comparison results, and determines which pixel positions need to be updated according to a preset regulation to output an output bit mask. An example of the preset regulation, when the sign of the pixel position between the previous bit mask and the current bit mask is different, the pixel position needs to be updated. For instance, when a pixel value at a coordinate [X1, Y1] in the current mask equals to 1 and in the previous mask equals to 0, the direct memory access with masks 203f copies the pixel of the image at the coordinate [X1, Y1] stored in the surface 203b to the display buffer 203e; or when a pixel value at a coordinate [X2, Y2] in the current mask equals to 0 and in the previous mask equals to 1, the direct memory access with masks 203f copies the pixel of the image at the coordinate [X2, Y2] stored in the surface 203b to the display buffer 203e. Another example of the preset regulation, when the sign of the pixel position of the current bit mask equals to logic 1, the pixel position needs to be updated. For instance, when a pixel value at a coordinate [X3, Y3] in the current mask equals to 1 and in the previous mask equals to 1, the direct memory access with masks 203f copies the pixel of the image at the coordinate [X3, Y3] stored in the surface 203b to the display buffer 203e.

Another example of the preset regulation, when the sign of the pixel position of the current bit mask equals to logic 0, the pixel position does not need to be updated. For instance, when a pixel value at a coordinate [X4, Y4] in the current mask equals to 0 and in the previous mask equals to 0, the direct memory access with masks 203f does not copy the pixel of the image at the coordinate [X4, Y4] stored in the surface 203b to the display buffer 203e.

Another example of the preset regulation, when the sign of the pixel position between the previous bit mask and the current bit mask is the same, the pixel position does not need to be updated. For instance, when a pixel value at a coordinate [X5, Y5] in the current mask equals to 0 and in the previous mask equals to 0, the direct memory access with masks 203f does not copy the pixel of the image at the coordinate [X5, Y5] stored in the surface 203b to the display buffer 203e.

Therefore, whether a pixel of the image stored in the surface 203b needs to be copied to the display buffer 203e or not, a determination result can be generated by comparing content values at the same coordinate in the current bit mask and the previous bit mask.

In an embodiment, the number of the display buffer 203e corresponds to the number of the mask buffer 203d.

An operation embodiment of the client device 203 of the invention is described below.

At first, assuming that the plurality of mask buffers 203d include two mask buffers A and B, and the plurality of display buffers 203e include two display buffers A and B. Please refer to FIGS. 3, 4A, 4B and 4C. During an initial state (frame F0), the graphic render engine 203a receives a destination region of the current frame F0, generates the current frame F0, and then stores the current frame F0 into the surface 203b. The mask generator 203c generates a current bit mask (F0) according to the destination region, and stores the current bit mask (F0) into the mask buffer A of the mask buffers 203d. Please note that since a frame in an initial state is usually to be a black frame, all pixels in the current frame F0 need to be updated. Therefore, all of pixel values in the current bit mask (F0) are logic 1 generated by the mask generator 203c according to the destination region of the current frame F0, and all of pixel values in a previous bit mask are naturally to be logic 0 generated by the mask generator 203c according to a destination region of a previous frame.

Then, the mask buffer A of the mask buffers 203d stores the current bit mask (F0), and the content values of the mask buffer A are indicating a current updated area of the current frame F0 stored in the surface 203b. Further the direct memory access with masks 203f performs OR operations or union mathematic operations over the previous bit mask and the current bit mask (F0) on a pixel-by-pixel basis to generate an output bit mask S2OBlitMask (previous bit mask||current bit mask (F0)), and copies the current updated area of the current frame F0 stored in the surface 203b to output a copied image to the buffer A of the plurality of display buffers 203e. Finally, the buffer A of the plurality of display buffers 203e receives the copied image from the direct memory access with masks 203f and reconstructs a complete image according to the copied image stored to output the complete image to the display device 205.

Figure 4A:
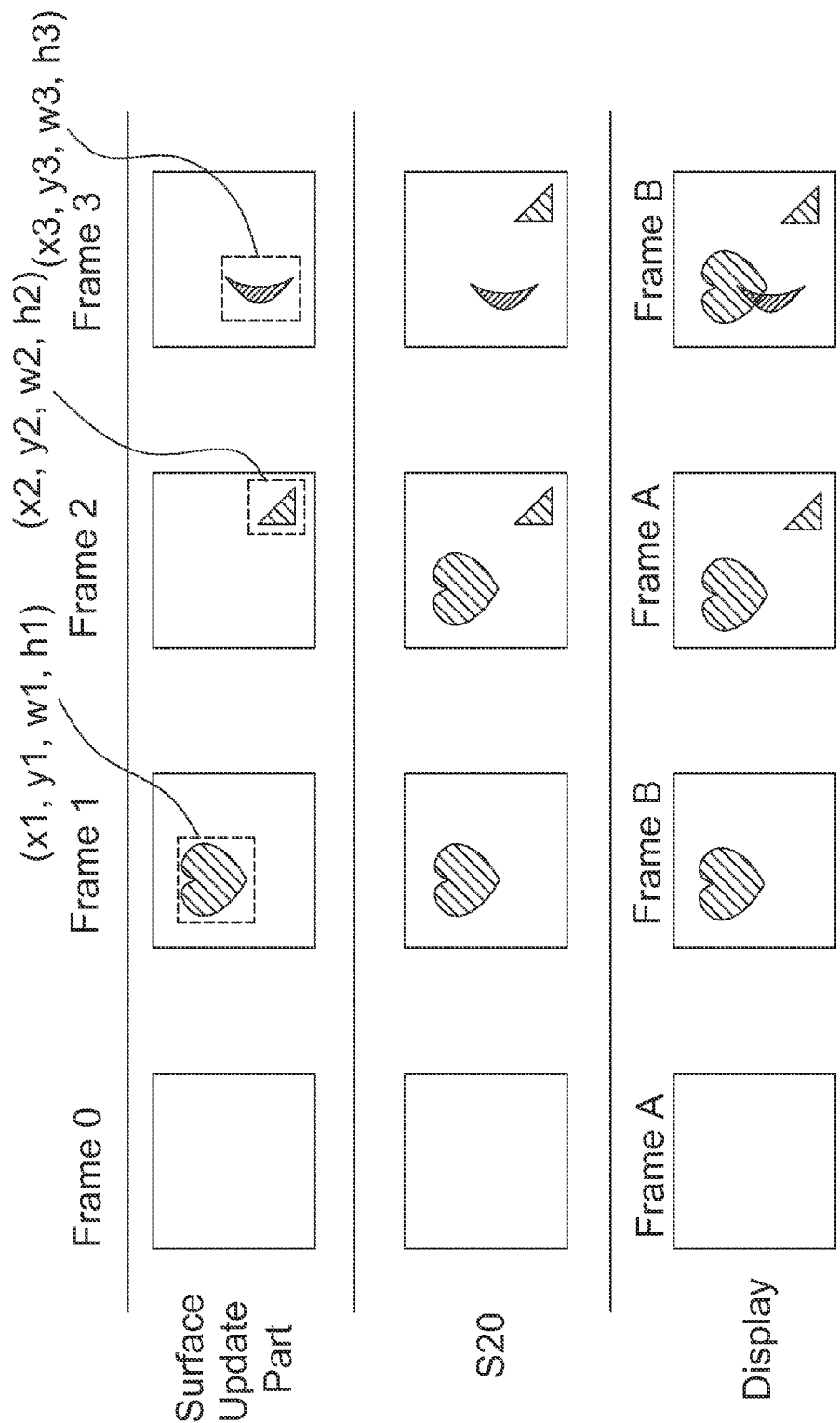
FIG. 4A shows an embodiment schematically operation diagram of the client device of the invention.
Figures 4B, 4C:
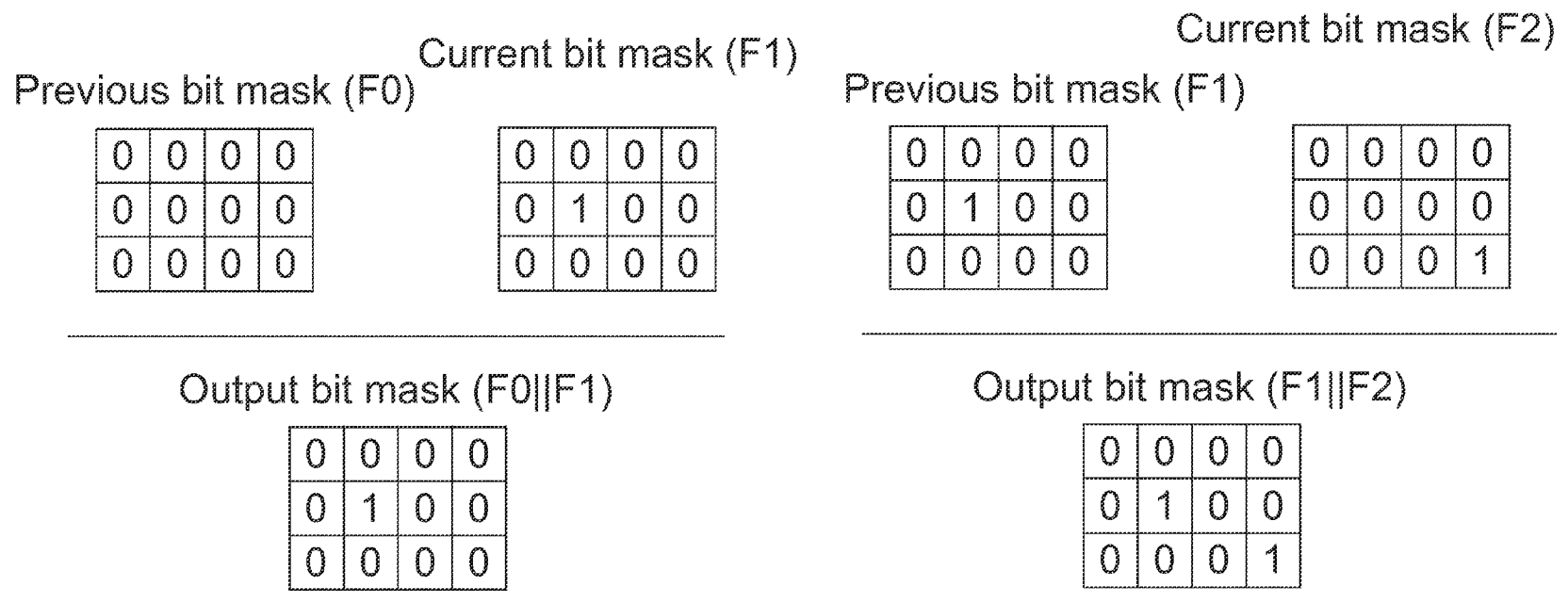

During frame F1, the graphic render engine 203a receives a destination region (x1, y1, w1, h1) of a current frame F1, such as a heart-shaped pattern as shown in FIG. 4A, generates the current frame F1, and then stores the current frame F1 into the surface 203b. The mask generator 203c generates a current bit mask (F1) according to the destination region (x1, y1, w1, h1). Then, the mask buffer B of the mask buffers 203d stores the current bit mask (F1), and the content values of the mask buffer B are indicating a current updated area of the current frame F1 stored in the surface 203b. The direct memory access with masks 203f performs OR operations or union mathematic operations over the previous bit mask (F0) and the current bit mask (F1) on a pixel-by-pixel basis to output an output bit mask S2OBlitMask, such as the output bit mask (F0|F1) as shown in FIG. 4B, and copies the current updated area of the current frame F1 and the previous updated area of the previous frame F0 stored in the surface 203b to output a copied image corresponding to the heart-shaped pattern to the buffer B of the plurality of display buffers 203e. Finally, the buffer B of the plurality of display buffers 203e receives the copied image from the direct memory access with masks 203f and reconstructs a complete image according to the copied image stored to output the complete image to the display device 205.

Please note that the logic 1 in the output bit mask (F0|F1) indicates an updated pixel value at the corresponding position of the current surface, but the logic 0 indicates no updated pixel at the corresponding position of the current surface. Further, it may need a plurality of logic 1 to construct a heart-shaped pattern in practice. In this embodiment, to simplify this description, only a logic 1 is used in the output bit mask (F0|F1) to stand for the heart-shaped pattern in the frame F1.

During frame F2, the graphic render engine 203a receives a destination region (x2, y2, w2, h2) of a current frame F2, such as a triangle-shaped pattern as shown in FIG. 4A, generates the current frame F2, and then stores the current frame F2 into the surface 203b. The mask generator 203c generates current bit mask (F2) according to the destination region (x2, y2, w2, h2). Then, the mask buffer A of the mask buffers 203d stores the current bit mask (F2), and the content values of the mask buffer A are indicating a current updated area of the current frame F2 stored in the surface 203b. Then the direct memory access with masks 203f performs OR operations or union mathematic operations over the previous bit mask (F1) and the current bit mask (F2) on a pixel-by-pixel basis to output an output bit mask S2OBlitMask, such as the output bit mask (F1|F2), as shown in FIG. 4C, and copies the current updated area of the current frame F2 and the previous updated area of the previous frame F1 stored in the surface 203b to output a copied image corresponding to the heart-shaped pattern and triangle-shaped pattern stored in the surface 203b to the buffer A of the plurality of display buffers 203e. Finally, the buffer A of the plurality of display buffers 203e receives the copied image from the direct memory access with masks 203f and reconstructs a complete image according to the copied image stored to output the complete image to the display device 205.

Please note that the logic 1 in the output bit mask (F1|F2) indicates an updated pixel at the corresponding position of the current surface or the previous surface, but the logic 0 indicates no updated pixel at the corresponding position of the current surface and the previous surface. The two logics 1 in the output bit mask (F1|F2) correspond to the heart-shaped pattern in the frame F1 and the triangle-shaped pattern in the frame F2 respectively. Further, it may need a plurality of logic 1 to construct a heart-shaped pattern and a triangle-shaped pattern actually. In this embodiment, for simplified this description, only two logics 1 in the output bit mask (F1|F2) are used to stand for the heart-shaped pattern and triangle-shaped pattern in the frame F1 and frame F2.

During frame F3, the graphic render engine 203a receives a destination region a destination region (x3, y3, w3, h3) of a current frame F3, such as a moon-shaped pattern as shown in FIG. 4A generates the current frame F3, and then stores the current frame F3 into the surface 203b. The mask generator 203c generates a current bit mask (F3) according to the destination region (x3, y3, w3, h3). Then, the mask buffer B of the mask buffers 203d stores the current bit mask (F3), and the content values of the mask buffer B are indicating a current updated area of the current frame F3 stored in the surface 203b. Then, the direct memory access with masks 203f performs OR operations or union mathematic operations over the previous bit mask (F2) and the current bit mask (F3) on a pixel-by-pixel basis to output an output bit mask S2OBlitMask, such as the output bit mask (F2|F3), as shown in FIG. 4D, and copies the current updated area of the current frame F3 and the previous updated area of the previous frame F2 stored in the surface 203b to output a copied image corresponding to the triangle-shaped pattern and moon-shaped pattern stored in the surface 203b of the buffer B to the plurality of display buffers 203e. Finally, the buffer B of the plurality of display buffers 203e receives the copied image from the direct memory access with masks 203f and reconstructs a complete image according to the copied image stored to output the complete image to the display device 205.

Please note that the logic 1 in the output bit mask (F2|F3) indicates an updated pixel at the corresponding position of the current surface or the previous surface, but the logic 0 indicates no updated pixel at the corresponding position of the current surface and the previous surface. The three logics 1 in the output bit mask (F2|F3) correspond to the heat-shaped pattern in the frame F1, the triangle-shaped pattern in the frame F2 and the moon-shaped pattern in frame F3 respectively. Further, it may need a plurality of logic 1 (pixels) to construct a heart-shaped pattern, a triangle-shaped pattern and a moon-shaped pattern actually. In this embodiment, for simplified this description, only three logics 1 in the output bit mask (F2|F3) are used to stand for the heart-shaped pattern, triangle-shaped pattern and the moon-shaped pattern in the frame 1, frame 2 and frame 3.

In this way, the embodiment of the client device uses a mask function to detect a destination region and fetch update pixels so that it only needs to store and process update pixels of a part of a frame but do not store and process a complete frame. Therefore, a cost of memory can be reduced and processing speed can be increased with keeping a function of removing tearing effect.

Figure 5:
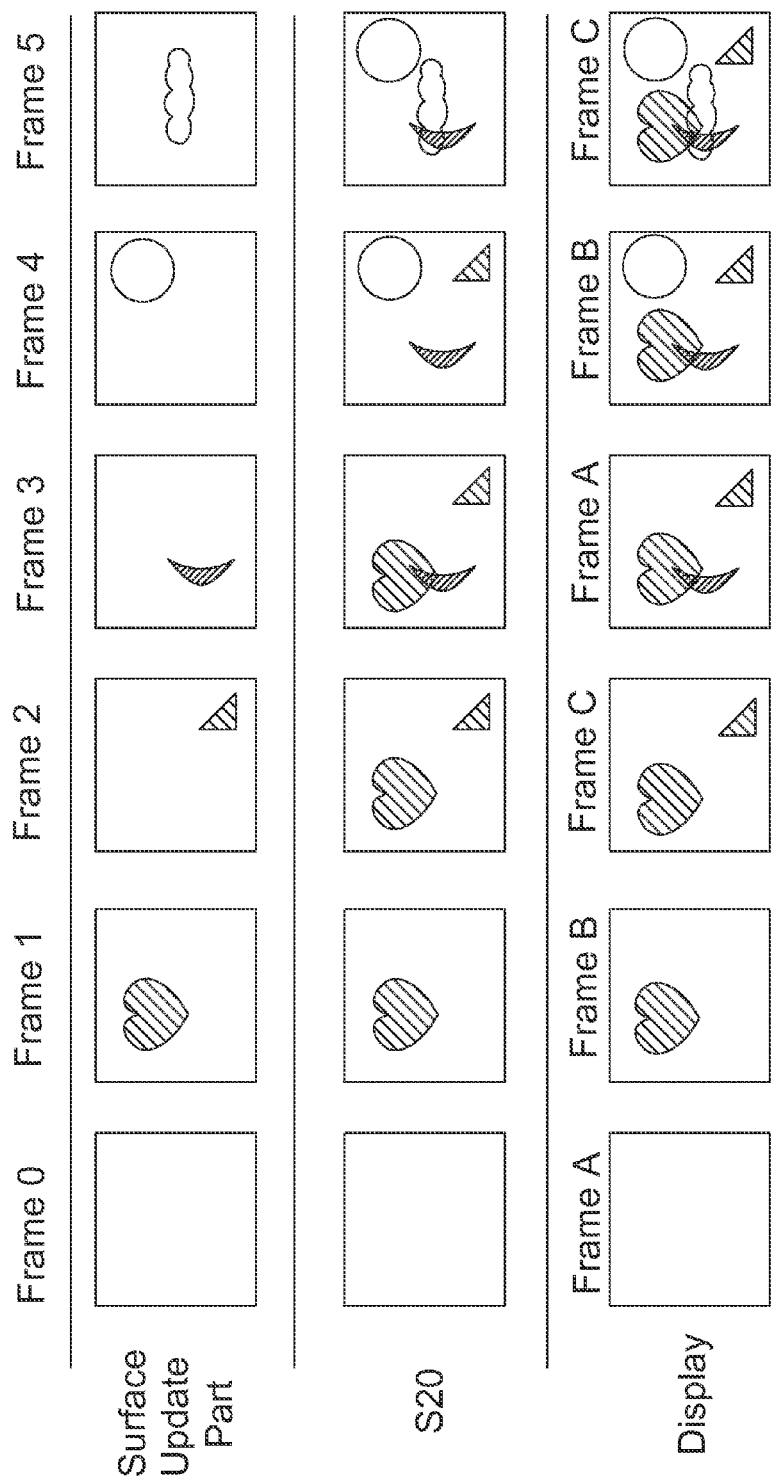
FIG. 5 shows another embodiment schematically operation diagram of the client device of the invention.

FIG. 5 shows another operation embodiment of a client device including three mask buffers and three display buffers. A person skilled in the art may realize the operation method and principle of FIG. 5 by referring to the above-mentioned description and it shall not be unnecessarily further described.

Figure 6:
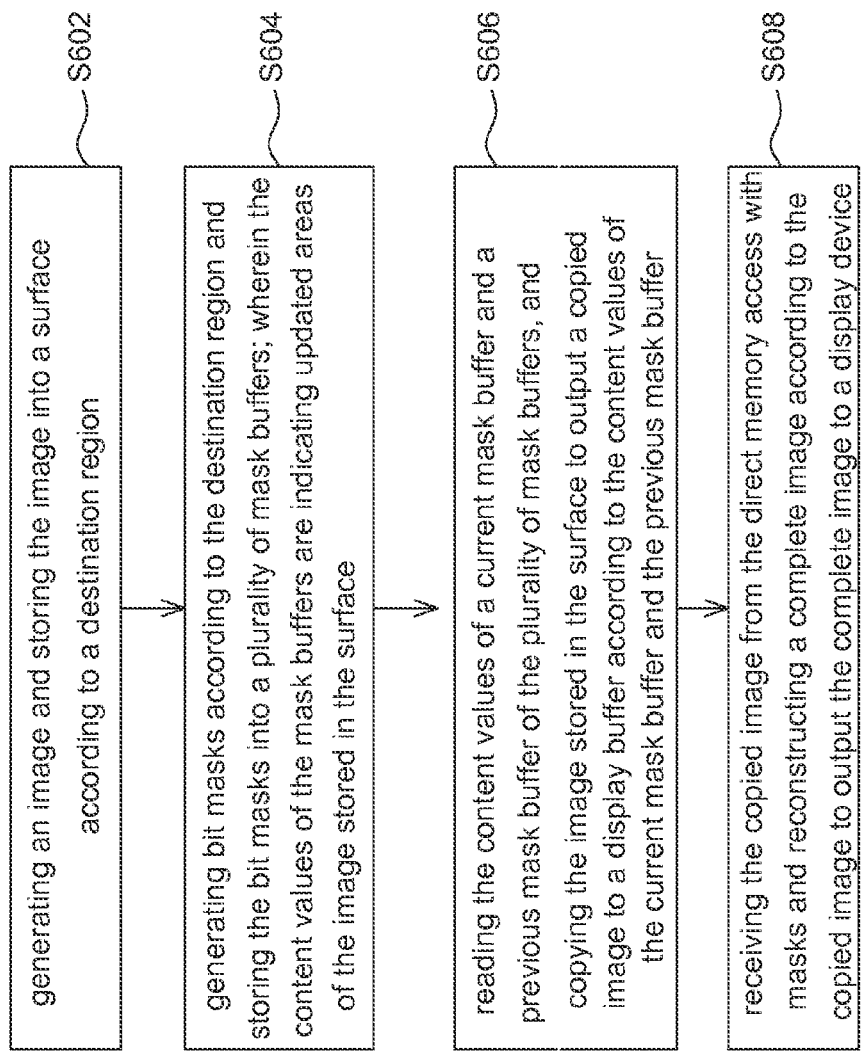
FIG. 6 shows a flow chart illustrating an embodiment of a method for processing graphics.

FIG. 6 shows a flow chart illustrating an embodiment of a method for processing graphics. The method for processing graphics is described as follows. The start step S602 indicates the generating an image and storing the image into a surface according to a destination region. The step S604 indicates the generating bit masks according to the destination region and storing the bit masks into a plurality of mask buffers; wherein the content values of the mask buffers are indicating updated areas of the image stored in the surface. The step S606 indicates the reading the content values of a current mask buffer and a previous mask buffer of the plurality of mask buffers, and copying the image stored in the surface to output a copied image to a display buffer according to the content values of the current mask buffer and the previous mask buffer. The step S608 indicates the receiving the copied image from the direct memory access with masks and reconstructing a complete image according to the copied image to output the complete image to a display device.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A client device, for receiving display rendering commands which indicate at least one destination region, comprising:
   at least a surface for storing an image;
   at least a graphic render engine, for generating the image and storing the image into the surface according to the at least one destination region;
   a plurality of mask buffers for storing bit masks; wherein the content values of the mask buffers are indicating updated areas of the image stored in the surface;
   at least a mask generator for generating the bit mask masks according to the at least one destination region, and stating the bit masks into the mask buffers;
   at least a direct memory access with masks, for reading the content values of the plurality of mask buffers, and copying the image stored in the surface to output a copied image to one of a plurality of display buffers according to a combination result of the content values of the plurality of mask buffers, wherein the combination result is an output of an OR operation or union mathematical operation on the content values; and
   the plurality of display buffers for receiving the copied image from the direct memory access with masks and reconstructing a complete image according to the copied image to output the complete image to a single display device.

2. The client device according to claim 1, wherein the direct memory access with masks copies a current updated area of a current frame and a previous updated area of a previous frame to the display buffer.

3. The client device according to claim 2, wherein in the bit mask, each pixel position is marked with one of two signs, indicating whether the pixel value at the corresponding position of the current frame and the previous frame is altered.

4. The client device according to claim 2, wherein a previous bit mask of the bit masks indicates the previous updated area of the previous frame and a current bit mask of the bit mask indicating the current updated area of the current frame.

5. The client device according to claim 4, wherein the direct memory access with masks processes the previous bit mask and the current bit mask to output an output bit mask.

6. The client device according to claim 4, wherein the direct memory access with masks compares the sign of each pixel position between the previous bit mask and the current bit mask to generate comparison results, and determines which pixel positions need to be updated according to a preset regulation to output an output bit mask.

7. The client device according to claim 6, wherein when the sign of a pixel position of the current bit mask equals to logic 1, the pixel position in the output bit mask is marked with a sign indicating its pixel value needs to be updated.

8. The client device according to claim 6, wherein when the sign of a pixel position between the previous bit mask and the current bit mask is different, the pixel position in the output bit mask is marked with a sign indicating its pixel value needs to be updated.

9. The client device according to claim 1, wherein the direct memory access with masks performs an "OR" operation or a union mathematic operation over the content values of the plurality of mask buffers.

10. The client device according to claim 1, wherein the number of the plurality of display buffers corresponds to the number of the plurality of mask buffers.

11. A graphic remoting system, comprising:
a network with a RDP protocol;
a server, for transferring display rendering commands, which indicate at least one destination region through the network;
a client device, comprising:
at least a surface for storing an image;
at least a graphic render engine, for generating the image and storing the image into the surface according to the at least one destination region;
a plurality of mask buffers for storing bit masks; wherein the content values of the mask buffers are indicating updated areas of the image stored in the surface;
at least a mask generator for generating the bit masks according to the at least one destination region, and storing the bit masks into the mask buffers;
at least a direct memory access with masks, for reading the content values of the plurality of mask buffers, and copying the image stored in the surface to output a copied image to one of a plurality of display buffers according to a combination result of the content values of the plurality of mask buffers, wherein the combination result is an output of an OR operation or union mathematical operation on the content values; and
the plurality of display buffers for receiving the copied image from the direct memory access with masks and reconstructing a complete image according to the copied image to output the complete image to a single display device.

12. The graphic remoting system according to claim 11, wherein the direct memory access with masks copies a current updated area of a current frame and a previous updated area of a previous frame to the display buffer.

13. The graphic remoting system according to claim 12, wherein in the bit mask, each pixel position is marked with one of two signs, indicating whether the pixel value at the corresponding position of the current frame and the previous frame is altered.

14. The graphic remoting system according to claim 13, wherein the direct memory access with masks compares the sign of each pixel position between a previous bit mask and a current bit mask to generate comparison results, and determines which pixel positions need to be updated according to a preset regulation to output an output bit mask.

15. The graphic remoting system according to claim 14, wherein when the sign of a pixel position between the previous bit mask and the current bit mask is different, the pixel position in the output bit mask is marked with a sign indicating its pixel value needs to be updated.

16. A method for processing graphics, comprising:
generating an image and storing the image into a surface according to at least one destination region contained in display rendering commands;
generating bit masks according to the at least one destination region and storing the bit masks into a plurality of mask buffers; wherein the content values of the mask buffers are indicating updated areas of the image stored in the surface;
reading the content values of the plurality of mask buffers by a direct memory access;
copying the image stored in the surface to output a copied image to one of a plurality of display buffers by the direct memory access according to a combination result of the content values of the plurality of mask buffers, wherein the combination result is an output of an OR operation or union mathematical operation on the content values; and
receiving the copied image from the surface and reconstructing a complete image according to the copied image by the plurality of display buffers to output the complete image to a single display device.

17. The method according to claim 16, wherein the step of copying the image further comprises:
copying a current updated area of a current frame and a previous updated area of a previous frame to the display buffer.

18. The method according to claim 17, wherein in the bit mask, each pixel position is marked with one of two signs, indicating whether the pixel value at the corresponding position of the current frame and the previous frame is altered.

19. The method according to claim 16, wherein the step of copying the image comprises:
comparing the sign of each pixel position between a previous bit mask and a current bit mask of the bit masks to generate comparison results; and
determining which pixel positions need to be updated according to a preset regulation to output an output bit mask; and
copying the image stored in the surface to output the copied image to the one of the plurality of display buffers according to the output bit mask.

20. The method according to claim 19, wherein the step of determining which pixel positions need to be updated further comprises:
when the sign of a pixel position between the previous bit mask and the current bit mask is different, marking the pixel position in the output bit mask with a sign indicating its pixel value needs to be updated.

* * * * *